2,518,675

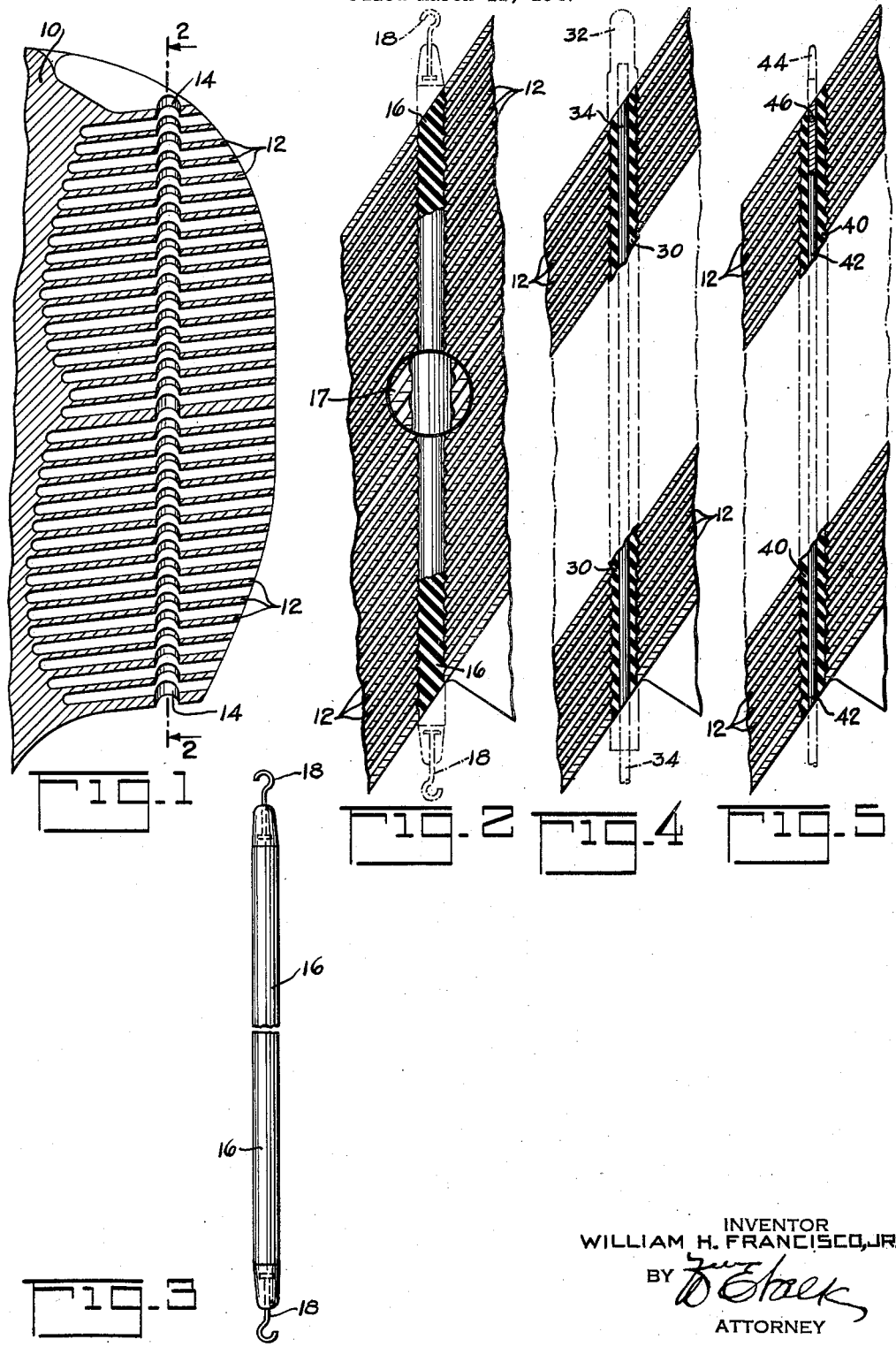
Aug. 15, 1950 — W. H. FRANCISCO, JR — 2,518,675
FIN DAMPING MEANS
Filed March 11, 1947
INVENTOR
WILLIAM H. FRANCISCO, JR.
ATTORNEY Patented Aug. 15, 1950

UNITED STATES PATENT OFFICE 2,518,675

FIN DAMPING MEANS

William H. Francisco, Jr., Bloomfield, N. J., assignor to Wright Aeronautical Corporation, a corporation of New York Application March 11, 1947, Serial No. 733,859

7 Claims. (Cl. 257—261)

This invention relates to vibration damping means and is more particularly directed to means for damping vibrations of fins projecting from a body which is to be heated or cooled as a result of the flow of a heat exchange fluid through the passages between the fins.

The cylinders of air cooled internal combustion engines are provided with a plurality of spaced fins projecting therefrom and between which relatively cool air is caused to flow for cooling the engine. One of the problems encountered with such cooling fin structures is that engine vibrations may induce destructive resonant vibration of the fins. An object of this invention is to provide a simple and novel means for damping vibration of said fins. Specifically, the invention comprises drilling an axially alined series of holes through the fins and inserting an elongate member of rubber-like material through said holes so that said material is squeezed out into the spaces between the fins.

Other objects of the invention will become apparent upon reading the annexed detailed description in connection with the drawing in which:

Figure 1 is a sectional view through a body having a plurality of heat exchange fins projecting therefrom and having a series of axially alined holes therethru;

Figure 2 is a sectional view taken along line 2—2 of Figure 1 with vibration damping means of the present invention installed in position on the fins;

Figure 3 is a side elevational view of the damping means illustrated in Figure 2, prior to its installation on the fins;

Figure 4 is a view similar to Figure 2 but illustrating a modified form of vibration damping means; and Figure 5 is a view similar to Figure 2 but illustrating a further modified form of vibration damping means.

Referring first to Figures 1 to 3, a body 10, which may comprise a portion of the cylinder head of an internal combustion engine, is provided with a plurality of substantially parallel heat exchange fins 12 projecting therefrom and between which a heat exchange fluid is adapted to flow. In order to dampen vibration of the fins 12, they are provided with a series of axially alined holes 14 extending therethrough inwardly of the outer edges of the fins—for example, by drilling through the plurality of fins as a unit structure. An elongate member 16 of rubber-like material extends through said axially alined holes 14 in such a manner that the rubber-like material of said member is squeezed out into the spaces between the fins 12. With this arrangement, the engagement of the fins with the rubber-like member 16 and the portion of the material of this member projecting between the fins effectively dampens vibration of the fins relative to each other and, at the same time, the plurality of the fins are not rigidly secured together for vibration as a unit. The holes 14 may be drilled normal to the surface of the fins 12. However, with the holes drilled at an angle substantially inclined to the fin surface, as illustrated, the member 16 is more effective to dampen fin vibration. For clarity a portion of Figure 2 has been magnified as indicated at 17.

In order to install the damper member 16, it is initially formed as a solid cylindrical rod of rubber-like material with a hook 18 molded into each end as illustrated. In its free condition—that is, in the absence of external forces—the member 16 has an outer diameter substantially larger than the internal diameter of said holes 14. The hooks 18 provide means whereby the member 16 may be strained by stretching to reduce its external diameter in order to permit insertion of this member through the alined holes 14. Thus, a suitable wire-like member may be passed through the alined holes 14 and attached to one of the hooks 18 whereby the damper member 16 may be stretched until its external diameter is reduced sufficiently to permit it to be inserted through the holes 14. After the damper member 16 has been inserted through the holes, the tension in the member 16, applied at the hooks 18, is removed whereupon the member 16 tends to return to its original diameter and, in so doing, expands diametrically into the spaces between the fins. The projection of the damper member 16 laterally into the spaces between the fins not only dampens vibration of the fins but also effectively secures this member to the fins without the provision of special means for this purpose. The two projecting ends of the damper member 16 may be cut off flush with the outer surface of the fins as illustrated in Figure 2, in which figure the cut-off portions of this member are illustrated by dot and dash lines.

Figure 4 illustrates a modified form of a member for damping vibrations of the fins 12. In Figure 4, the damper member 30 is a tubular member of rubber-like material closed at one end 32. The damper member 30 has a free external diameter greater than the internal diameter of the holes 14 in the fins. A rod 34 is adapted to be inserted into the tubular member 30 against its closed end 32 and the member 30 is stretched over the rod 34 until its external diameter has been reduced sufficiently to permit it to be inserted through the alined holes 14 in the fins 12. After the damper member 30 has been inserted through said holes 14, the tension in said member is released by removing the rod 34 from the damper member 30 whereupon this member tends to expand back to its original diameter thereby expanding into the spaces between the fins 12. As illustrated in Figure 4, the projecting ends of the damper member 30 may be cut off flush with the fins.

Figure 5 illustrates a further modified form of the damper member. In this modification a damper member 40 is tubular and is made of rubber-like material but the external diameter of this member is such as to permit it to be inserted through the alined holes 14 in its free condition. After the member 40 has been inserted through the holes 14, a relatively rigid rod 42, having an external diameter somewhat larger than the free internal diameter of the damper member 40, is forced therethrough. For this purpose, the one end of the rod 42 is tapered, as illustrated, at 44. Because the rod 42 has an external diameter larger than the free internal diameter of the rubber-like member 40, the material of this member is forced into the spaces between the fins 12 when the rod 42 is forced through said member. The projecting ends of the rod 42 and member 40 may be cut off flush with the end fins. In addition, some means—as a cotter pin 46—may be provided to maintain the rod 42 in position within the tubular damper member 40.

In all of the aforedescribed modifications of the invention, an elongate damper member of rubber-like material extends through an axially alined series of holes in a plurality of fins with the rubber-like material of said member extending laterally into the spaces between the fins thereby providing an effective arrangement for damping vibrations of the fins. In addition, the damping means is of simple construction, can readily be installed and the projection of the rubber-like material of said damping means into the spaces between the fins secures said damping means to said fins without the addition of special means for this purpose.

While I have described my invention in detail in its present preferred embodiments, it will be obvious to those skilled in the art, after understanding my invention, that various changes and modifications may be made therein without departing from the spirit or scope thereof. I aim in the appended claims to cover all such modifications.

I claim as my invention:

1. In combination: a body having a plurality of heat exchange fins projecting therefrom, said fins having a series of axially alined holes therethrough; and means for suppressing vibration of said fins, said means comprising an elongate member of rubber-like material extending through said holes, said member having a circumferentially continuous outer surface which projects laterally into the annular spaces about said member between pairs of adjacent fins.

2. In combination; a body having a plurality of heat exchange fins projecting therefrom, said fins having a series of axially alined holes therethrough; and means for suppressing vibration of said fins, said means comprising a cylindrical member of rubber-like material extending through said holes and having a circumferentially continuous outer surface with a free external diameter greater than the diameter of said holes whereby the material of said member projects laterally therefrom into the spaces between said fins.

3. In combination; a body having a plurality of heat exchange fins projecting therefrom, said fins having a series of axially alined holes therethrough; and means for suppressing vibration of said fins, said means comprising a solid rod of rubber-like material extending through said holes and projecting laterally into the spaces between said fins.

4. In combination; a body having a plurality of heat exchange fins projecting therefrom, said fins having a series of axially alined holes therethrough; and means for suppressing vibration of said fins, said means comprising a tubular member having a circumferentially continuous annular wall about its hollow interior, said member being of rubber-like material and extending through said holes and projecting laterally into the spaces between said fins.

5. In combination; a body having a plurality of heat exchange fins projecting therefrom, said fins having a series of axially alined holes therethrough; and means for suppressing vibration of said fins, said means comprising a tubular member of rubber-like material extending through said holes; and a relative rigid rod extending through said tubular member, said rod having an external diameter greater than the free internal diameter of said tubular member such that said rod forces the material of said member laterally into the spaces between said fins.

6. In combination; a body having a plurality of heat exchange fins projecting therefrom, said fins having a series of axially alined holes therethrough substantially inclined to the surface of said fins; and means for suppressing vibration of said fins, said means comprising an elongate member of rubber-like material extending through said holes, said member having a circumferentially continuous outer surface which projects laterally into the annular spaces about said member between pairs of adjacent fins.

7. In combination; a body having a plurality of heat exchange fins projecting therefrom, said fins having a series of alined holes therethrough; and means for suppressing vibration of said fins, said means comprising a member of rubber-like material extending through said holes, said member having a circumferentially continuous cylindrical outer surface with a free diameter greater than the diameter of said holes prior to insertion into said holes so that said member must be strained to reduce its external diameter to permit its insertion into said holes and, upon insertion into said holes and upon removal of said strain, the material of said member projects laterally into the annular spaces about said member between pairs of adjacent fins.

WILLIAM H. FRANCISCO, Jr.

REFERENCES CITED

The following references are of record in the file of this patent:

UNITED STATES PATENTS

| Number | Name | Date |
| --- | --- | --- |
| 2,253,025 | Fedden et al. | Aug. 19, 1941 |
| 2,396,363 | Du Bois et al. | Mar. 12, 1946 |